United States Patent
Omori (10) Patent No.: US 8,121,408 B2
(45) Date of Patent: Feb. 21, 2012

(54) IMAGE PROCESSING METHOD AND APPARATUS FOR FACE IMAGE

(75) Inventor: Yusuke Omori, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 373 days.

(21) Appl. No.: 12/555,897

(22) Filed: Sep. 9, 2009

(65) Prior Publication Data

US 2010/0061631 A1 Mar. 11, 2010

(30) Foreign Application Priority Data

Sep. 10, 2008 (JP) .................................. 2008-231909

(51) Int. Cl.
*G06K 9/00* (2006.01)
*G06K 9/34* (2006.01)
*G06K 9/38* (2006.01)

(52) U.S. Cl. ......... 382/173; 382/115; 382/118; 382/168

(58) Field of Classification Search .......... 382/115–118, 382/168–180

See application file for complete search history.

(56) References Cited

U.S. PATENT DOCUMENTS

| 6,292,574 B1 * | 9/2001 | Schildkraut et al. .......... 382/117 |
| 2006/0222217 A1 * | 10/2006 | Kitamura et al. ............. 382/118 |
| 2007/0195996 A1 | 8/2007 | Kitamura |

FOREIGN PATENT DOCUMENTS

| JP | 2001-222683 A | 8/2001 |
| JP | 2001-245148 A | 9/2001 |
| JP | 2007-226424 A | 9/2007 |

* cited by examiner

*Primary Examiner* — Alex Liew (74) *Attorney, Agent, or Firm* — Birch, Stewart, Kolasch & Birch, LLP (57) ABSTRACT

An image processing method for a face image is provided. A skin area of a face is segmented from the face image. A brightness histogram of the skin area is generated. A skin shadow point and an eyeball point of the face are extracted from the skin area, the shadow point having a lowest brightness in the skin area. A modified histogram is generated by modifying the brightness histogram so as to correct a specific area having a lower brightness level than the eyeball point at a brightness level of the eyeball point, and to correct a specific portion in the skin area having a higher brightness level than the shadow point at a brightness level of the shadow point. The face image is thresholded in consideration of the modified histogram to produce a binary image or N-level encoded image.

9 Claims, 9 Drawing Sheets

IMAGE PROCESSING METHOD AND APPARATUS FOR FACE IMAGE

BACKGROUND OF THE INVENTION

1. Field of the Invention

The present invention relates to an image processing method and apparatus for a face image. More particularly, the present invention relates to an image processing method and apparatus for a face image in which the face image is extracted from an original image and a thresholded image of the face image can be produced with a high quality.

2. Description Related to the Prior Art

Various new techniques for service have been developed with wide use of the cellular phone. For example, there is a technique for uploading a face image recorded by use of a built-in camera of the cellular phone, and transforming the face image into a binary image of a simplified form. To this end, an image pickup condition for recording the face image must be limited and optimized for conditioning the production of the binary image, for example, limited property of the light amount of the background, color range and the like. It is very difficult to produce the binary image of an acceptable quality if the image pickup condition is unsuitable before recording the face image.

There are various known methods of thresholding or binarization. JP-A 2001-245148 discloses the thresholding of a local manner in which an original image contains a high density portion and a low density portion, and the low density portion is prevented from being thresholded with poor appearance upon occurrence of signal noise. JP-A 2001-222683 discloses an example of the thresholding in which an original image contains alphanumeric information with a shaded font, and signal noise derived from a blank portion of the image can be eliminated before producing the thresholded image.

Image pickup of the face image must be carried out in the optimized image pickup condition before the binary image or simplified image can be obtained. This is a problem in high difficulty in the image production. In the above suggested technique of the thresholding in which the linear discriminant analysis, it is highly difficult to produce the binary image neatly particularly if an image is a face image with finely distributed shading of surface texture.

SUMMARY OF THE INVENTION

In view of the foregoing problems, an object of the present invention is to provide an image processing method and apparatus for a face image in which the face image is extracted from an original image and a thresholded image of the face image can be produced with a high quality.

In order to achieve the above and other objects and advantages of this invention, an image processing method of image processing of a face image is provided. In the image processing method, the face image is processed monochromatically by gray scale processing. A first image area inclusive of a skin area of a face is segmented from the face image after the gray scale processing. A second image area is specified, inclusive of the first image area and also a hair area of the face in the face image. A brightness histogram of the first image area is generated. A shadow point and an eyeball point of the face are extracted from the first image area, the shadow point having a lowest brightness in the skin area. A modified histogram is generated by modifying the brightness histogram so as to correct a specific area having a lower brightness level than the eyeball point at a brightness level of the eyeball point, and to correct a specific portion in the skin area having a higher brightness level than the shadow point at a brightness level of the shadow point. One to three thresholds are determined from the modified histogram. The second image area is thresholded by use of the one to three thresholds to produce an N-level encoded image, where N is an integer of 2 or more.

Information of N is input by external operation.

Furthermore, an eye shape is detected by retrieving coordinates of eyes from the face image, and of enhancing an edge of the eye shape for correction.

Furthermore, the N-level encoded image is converted into vector data.

Also, an image processing apparatus for image processing of a face image is provided. A gray scale processing device processes the face image monochromatically by gray scale processing. An image segmentation device segments a first image area inclusive of a skin area of a face from the face image after the gray scale processing. An area specifying device specifies a second image area inclusive of the first image area and also a hair area of the face in the face image. A histogram generator generates a brightness histogram of the first image area. A feature point extracting device extracts a shadow point and an eyeball point of the face from the first image area, the shadow point having a lowest brightness in the skin area. A modified histogram generator generates a modified histogram by modifying the brightness histogram so as to correct a specific area having a lower brightness level than the eyeball point at a brightness level of the eyeball point, and to correct a specific portion in the skin area having a higher brightness level than the shadow point at a brightness level of the shadow point. A threshold generator determines one to three thresholds from the modified histogram. An image thresholding device thresholds the second image area by use of the one to three thresholds to produce an N-level encoded image, where N is an integer of 2 or more.

Furthermore, an output interface outputs the N-level encoded image from the image thresholding device.

Furthermore, an input interface inputs information of N.

Furthermore, an eye shape correction device detects an eye shape by retrieving coordinates of eyes from the face image, and enhances an edge of the eye shape for correction.

Furthermore, a vector data converter converts the N-level encoded image into vector data.

Also, an image processing computer-executable program for image processing of a face image is provided, and includes a processing program code for processing the face image monochromatically by gray scale processing. A segmenting program code is for segmenting a skin area of a face from the face image after the gray scale processing. A specifying program code is for specifying an image area inclusive of the skin area and also a hair area of the face in the face image. A determining program code is for determining one to three thresholds in consideration of the skin area. A thresholding program code is for thresholding the image area by use of the one to three thresholds to produce an N-level encoded image, where N is an integer of 2 or more.

Also, an image processing computer-executable program for image processing of a face image is provided, and includes a segmenting program code for segmenting a skin area of a face from the face image. A generating program code is for generating a brightness histogram of the skin area. An extracting program code is for extracting a skin shadow point and an eyeball point of the face from the skin area, the shadow point having a lowest brightness in the skin area. A modifying program code is for generating a modified histogram by modifying the brightness histogram so as to correct a specific area having a lower brightness level than the eyeball point at a brightness level of the eyeball point, and to correct a specific portion in the skin area having a higher brightness level than the shadow point at a brightness level of the shadow point. A thresholding program code is for thresholding the face image in consideration of the modified histogram to produce an N-level encoded image, where N is an integer of 2 or more.

In one aspect of the invention, an image processing method of image processing of a face image is provided. In the image processing method, the face image is processed monochromatically by gray scale processing. A skin area of a face is segmented from the face image after the gray scale processing. An image area inclusive of the skin area and also a hair area of the face is specified in the face image. One to three thresholds are determined in consideration of the skin area. The image area is thresholded by use of the one to three thresholds to produce an N-level encoded image, where N is an integer of 2 or more.

Furthermore, a brightness histogram of the skin area is generated. A skin shadow point and an eyeball point of the face are extracted from the skin area, the shadow point having a lowest brightness in the skin area. A modified histogram is generated by modifying the brightness histogram so as to correct a specific area having a lower brightness level than the eyeball point at a brightness level of the eyeball point, and to correct a specific portion in the skin area having a higher brightness level than the shadow point at a brightness level of the shadow point. The one to three thresholds are determined from the modified histogram.

Also, an image processing method of image processing of a face image is provided. In the image processing method, a skin area of a face is segmented from the face image. A brightness histogram of the skin area is generated. A skin shadow point and an eyeball point of the face are extracted from the skin area, the shadow point having a lowest brightness in the skin area. A modified histogram is generated by modifying the brightness histogram so as to correct a specific area having a lower brightness level than the eyeball point at a brightness level of the eyeball point, and to correct a specific portion in the skin area having a higher brightness level than the shadow point at a brightness level of the shadow point. The face image is thresholded in consideration of the modified histogram to produce an N-level encoded image, where N is an integer of 2 or more.

Furthermore, the face image is processed monochromatically by gray scale processing. The skin area is segmented from the face image after the gray scale processing. An image area inclusive of the skin area and also a hair area of the face is specified in the face image. One to three thresholds are determined from the modified histogram. The N-level encoded image is produced by thresholding the image area by use of the one to three thresholds.

Therefore, a thresholded image of the face image can be produced with a high quality, because of the use of the brightness histogram and its modification according to the first image area.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
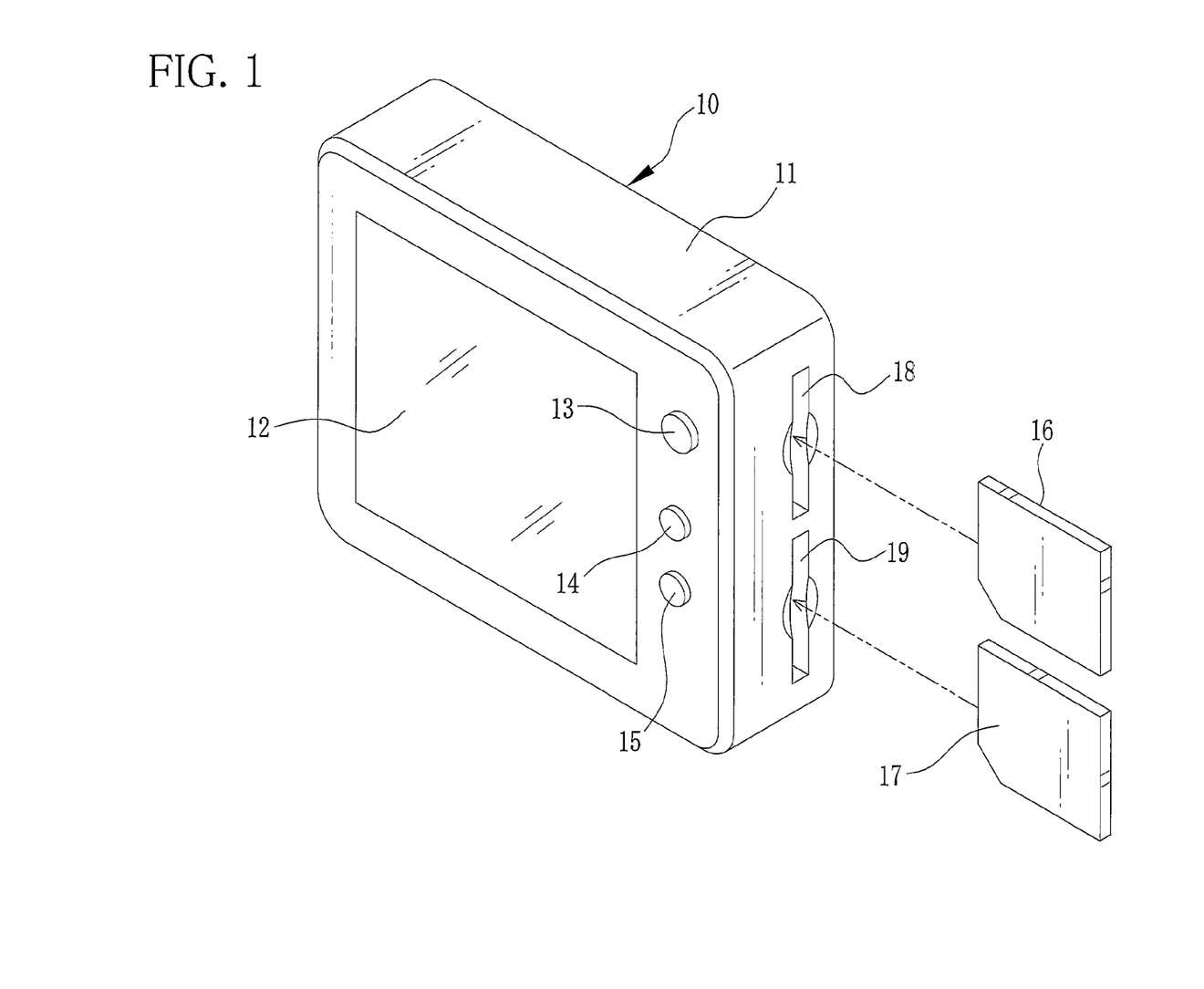
FIG. 1 is a perspective view illustrating an image processing apparatus of the invention.
Figure 3:
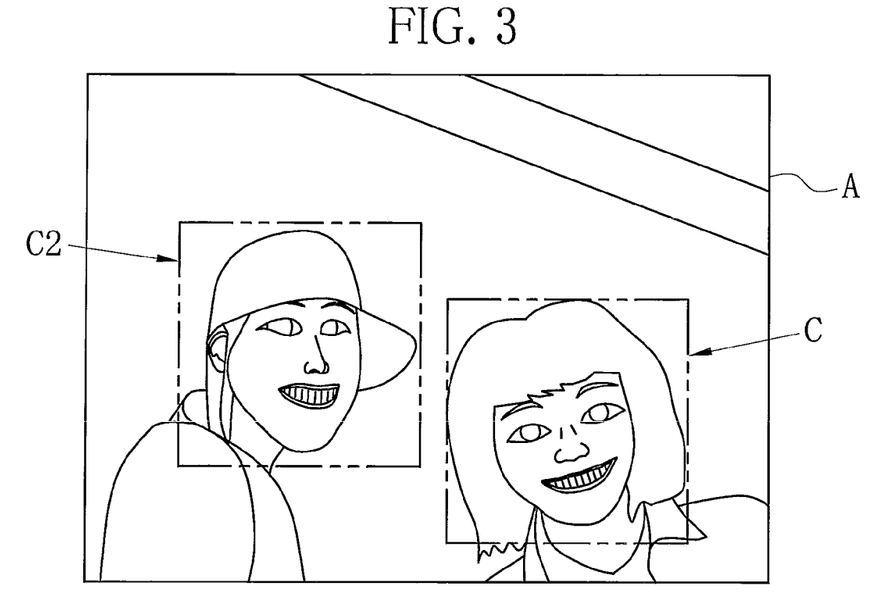
FIG. 3 is an explanatory view in a plan illustrating an image.
Figure 4:
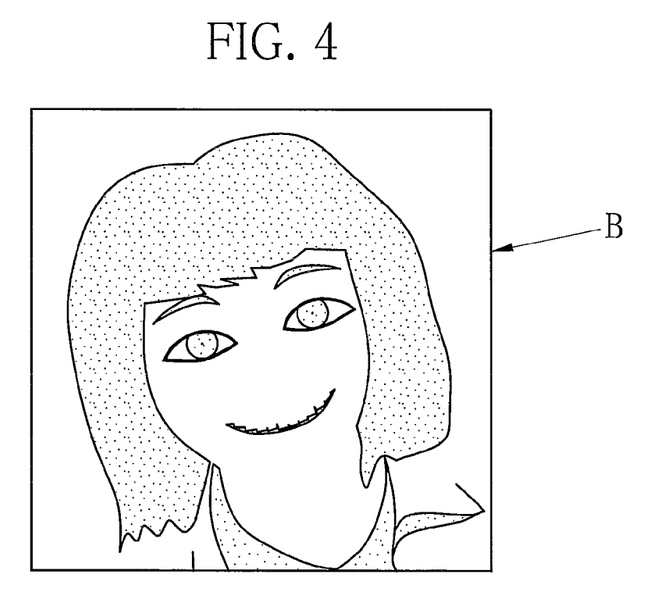
FIG. 4 is an explanatory view in a plan illustrating a thresholded image.

In FIG. 1, an image processing apparatus 10 of the invention is capable of producing a binary image B or multi-level encoded image as a morphologically transformed image (See FIG. 4) by thresholding an original image A (See FIG. 3). The image processing apparatus 10 has a housing 11 of a quadrilateral shape. There are an LCD display panel 12, a power button 13, a selection button 14 and a confirmation button 15 disposed in front of the housing 11. Two card slots 18 and 19 are formed in a lateral surface of the housing 11. A memory card 16 is loaded removably in the card slot 18, and stores original images. A memory card 17 is loaded removably in the card slot 19, and accessed for writing thresholded images as output. When the power button 13 is turned on after setting the memory cards 16 and 17 in the card slots 18 and 19, icons are displayed on the LCD 12 as indicia for image data of the original images. A touch panel constitutes the LCD 12. When a finger of a user or an input pen (not shown) as an accessory tool touches one of the icons displayed on the LCD 12, the touched icon is selected. Furthermore, a user can depress the selection button 14, shift a cursor indicia stepwise through a train of the icons, and select one of the icons, before he or she depresses the confirmation button 15 to confirm the selection. An original image associated with the icon can be displayed.

Figure 2:
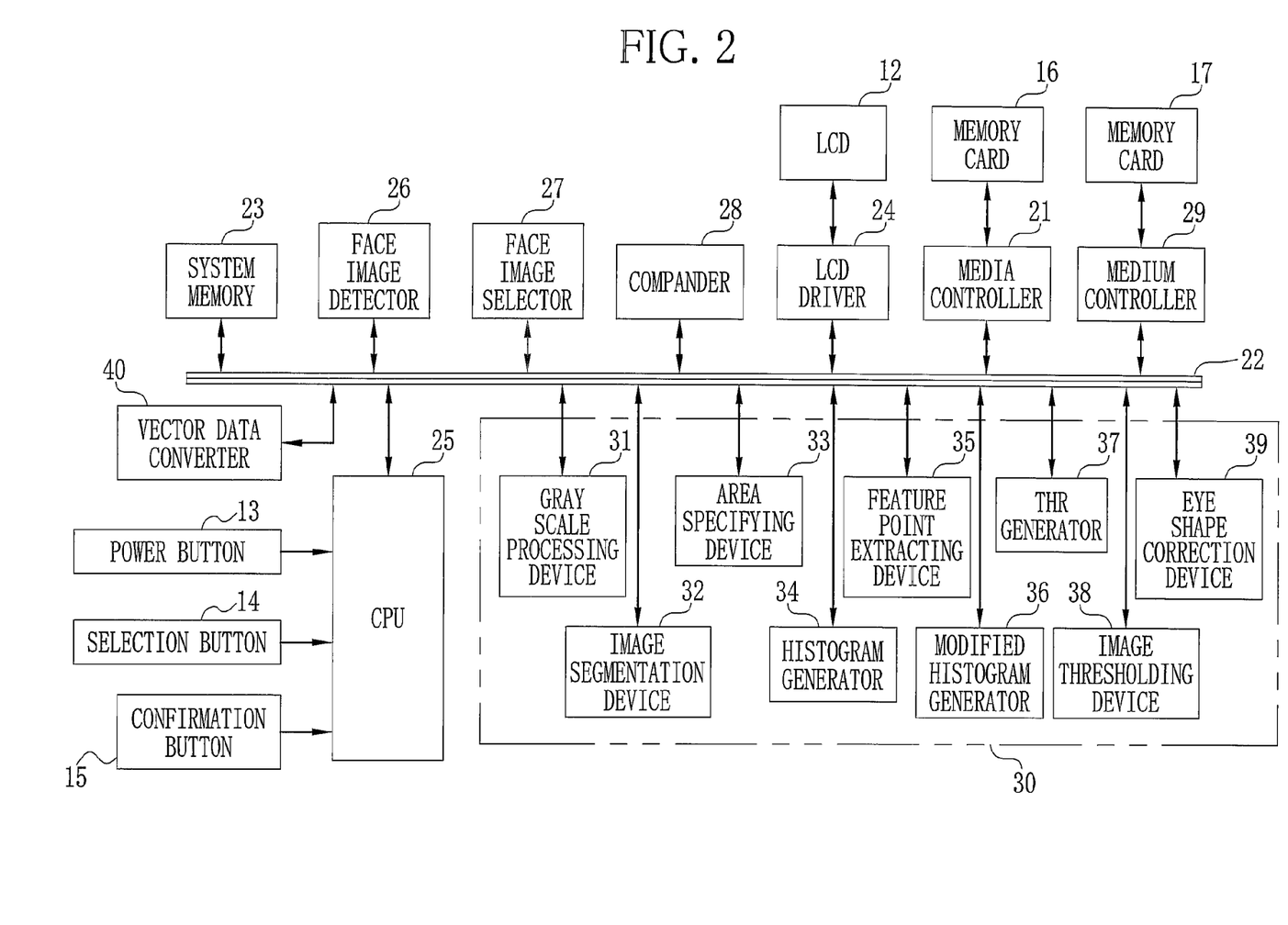
FIG. 2 is a block diagram illustrating circuit arrangement of the image processing apparatus.

In FIG. 2, a media controller 21 reads an original image A from the memory card 16. There is a data bus 22 to which a system memory 23 is connected. The original image A is transmitted through the data bus 22 and written to a RAM area in the system memory 23. An LCD driver 24 converts the data of the original image A into a composite signal of an analog form. The LCD 12 is supplied with the data of the original image A, and caused to display the original image A. The system memory 23 includes an area of ROM for storing various control programs and profile information, and the area of RAM as working memory. A CPU 25 performs various tasks by reading data or program from the ROM area by use of the RAM area. For example, a sequencing program is read from the ROM area of the system memory 23, and run by use of the RAM area as working memory. The CPU 25 is supplied with control signals generated by operating the power button 13, the selection button 14 and the confirmation button 15.

Various circuit elements are connected to the CPU 25 by the data bus 22, including a face image detector 26, a face image selector 27, a thresholding processor 30, a compander 28 for compression and expansion, and a medium controller 29. The face image detector 26 detects plural face images C (See FIG. 3) within the original image A. The face image selector 27 operates in response to inputs with the selection button 14 and the confirmation button 15, and selects one of the plural face images C displayed on the LCD 12. The thresholding processor 30 produces a binary image B from the face image C selected by the face image selector 27. The compander 28 reads the binary image B from the RAM area in the system memory 23, and compresses the binary image B in a well-known format, for example JPEG (Joint Photographic Experts Group), the RAM area being used for temporary storage of the binary image B. The medium controller 29 is an output interface and writes the compressed binary image B to the memory card 17. Examples of formats of the compression can be transparent PNG, transparent GIF and the like in which a white area is transparent and a black area is opaque. It is also possible to add a vector data converter 40, which may operate before the compression, and convert the image data of the face image into vector data which is convertible into CAD data. The vector data can be compressed by a predetermined format of the compression, and then written to the memory card 17.

The face image detector 26 splits the original image A into 16×16 blocks in a square matrix. Signal levels of color signals of red, green and blue in the blocks are evaluated to select blocks with comparatively numerous pixels of a flesh color. Furthermore, the blocks with comparatively numerous pixels of the flesh color are evaluated to select blocks with pixels of white for eye portions and pixels of a color of an eyeball (for example, black or brown). Coordinates of eye portions of the face are determined in the image. A group of the blocks having pixels of the flesh color is regarded as a face image. The detection of the face image enables data processing of various functions disclosed in U.S. Ser. No. 2007/195996 (corresponding to JP-A 2007-226424), namely detection of a nose, mouth and other parts of the face, detection of shadow points beside the nose with the lowest brightness in a skin area, and determination of coordinates of those positions.

Figure 5:
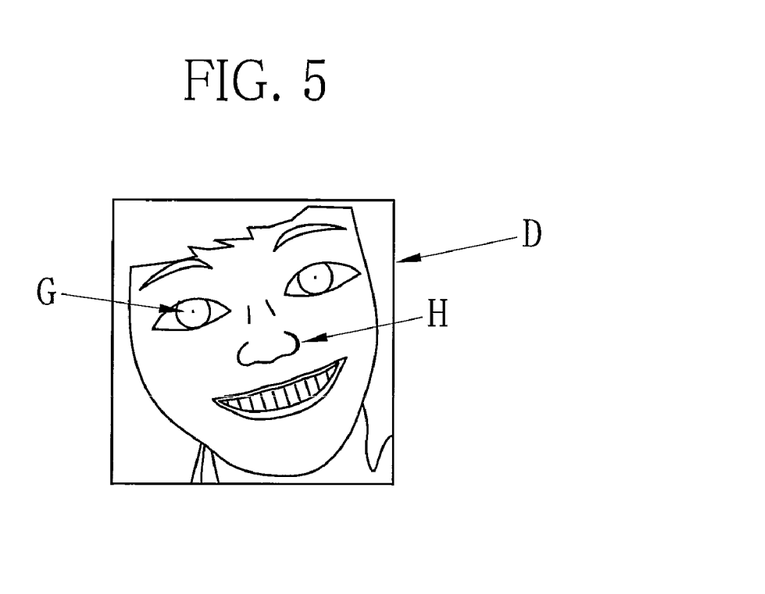
FIG. 5 is an explanatory view in a plan illustrating a first image area for setting a threshold.
Figure 6:
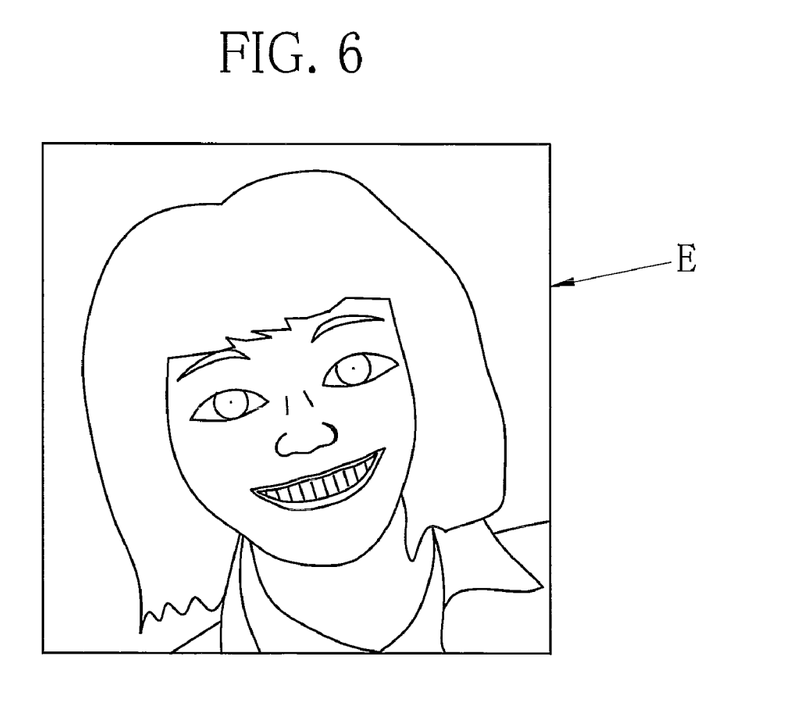
FIG. 6 is an explanatory view in a plan illustrating a second image area to produce a thresholded image.
Figure 7:
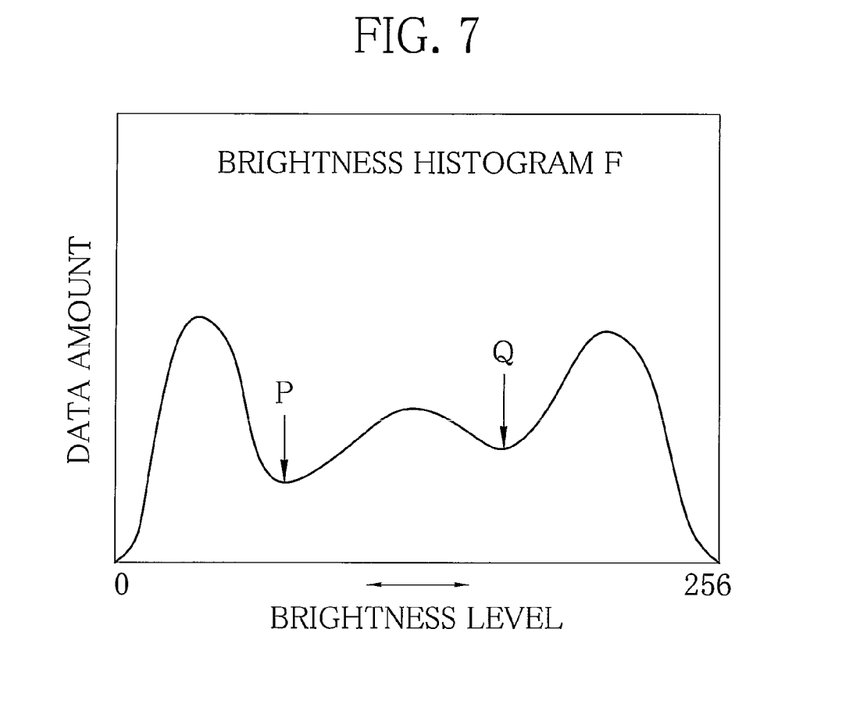
FIG. 7 is a graph illustrating a brightness histogram.
Figure 8:
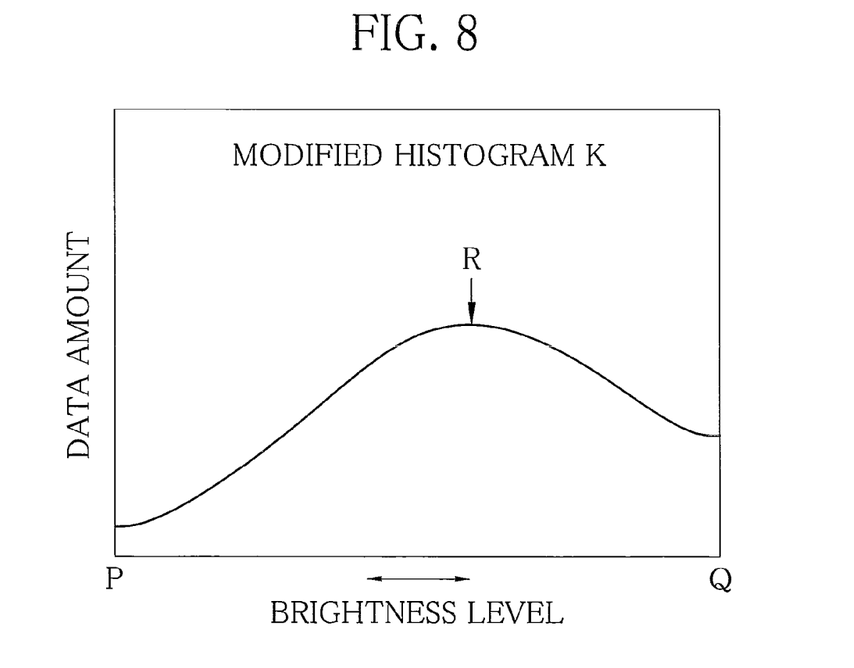
FIG. 8 is a graph illustrating a modified histogram.

The thresholding processor 30 includes a gray scale processing device 31, an image segmentation device 32 for segmenting a face image by cropping, an area specifying device 33 to produce a thresholded image, a histogram generator 34, a feature point extracting device 35, a modified histogram generator 36, a threshold generator 37, an image thresholding device 38 or binary image generator, and an eye shape correction device 39. The gray scale processing device 31 converts an original image A into a monochromatic image. The image segmentation device 32 segments a first image area D for setting a threshold from the entirety of the original image A after the gray scale processing as entirety of a skin area of the face without hair, background object or the like (See FIG. 5). The area specifying device 33 determines a second image area E to produce a thresholded image (See FIG. 6), the second image area E including a hair area of the face and the first image area D to have a larger region in comparison with this. The histogram generator 34 generates a brightness histogram F (See FIG. 7) according to the first image area D. The feature point extracting device 35 detects an eyeball point G of the eyes and a shadow point H or lowest brightness point (See FIG. 5) from the first image area D, the shadow point H being disposed beside a nose and having the lowest brightness point among various points in the skin area of the face. The modified histogram generator 36 generates a modified histogram K (See FIG. 8) by data correction of the brightness histogram F in such a manner that points with lower brightness than the eyeball point G of the eyes have brightness set equal to that of the eyeball point G of the eyes, and that points with higher brightness than the shadow point H have brightness set equal to that of the shadow point H. The threshold generator 37 determines a threshold according to the modified histogram for producing a binary image B from the second image area E. The image thresholding device 38 binarizes or thresholds the second image area E according to the threshold to produce the binary image. The eye shape correction device 39 obtains coordinates of eyes from the original image A, detects contour lines of the eyes, and corrects the image for enhancing the thickness of the contour lines.

Figure 9:
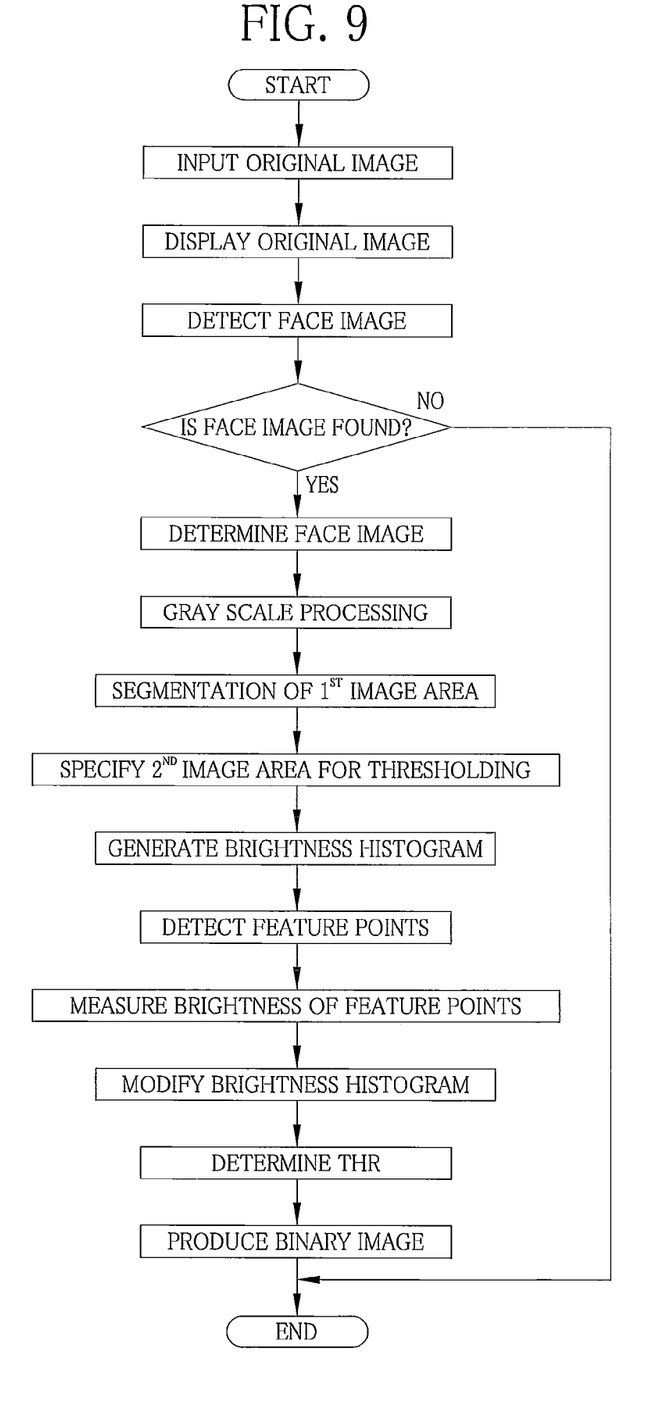
FIG. 9 is a flow chart illustrating steps for thresholding.

The operation of the image transformation according to the invention is described now by referring to the flow in FIG. 9. The card slot 18 of the image processing apparatus 10 is loaded with the memory card 16 storing an original image A. The card slot 19 is loaded with the memory card 17 which is ready to store a morphologically transformed image or thresholded image B. The power button 13 is turned on, and causes the LCD 12 to display all icons of original images stored in the memory card 16. A user handles an input pen to touch one of the icons as desired, and depresses the confirmation button 15. Then the original image A of the touched icon is displayed. The original image A is subjected to the face detection of the face image detector 26, which detects all face images contained in the original image A. If no face image is detected, then a message of having detected no face image is displayed on the LCD 12. The user can select another original image for image thresholding again.

Figure 10:
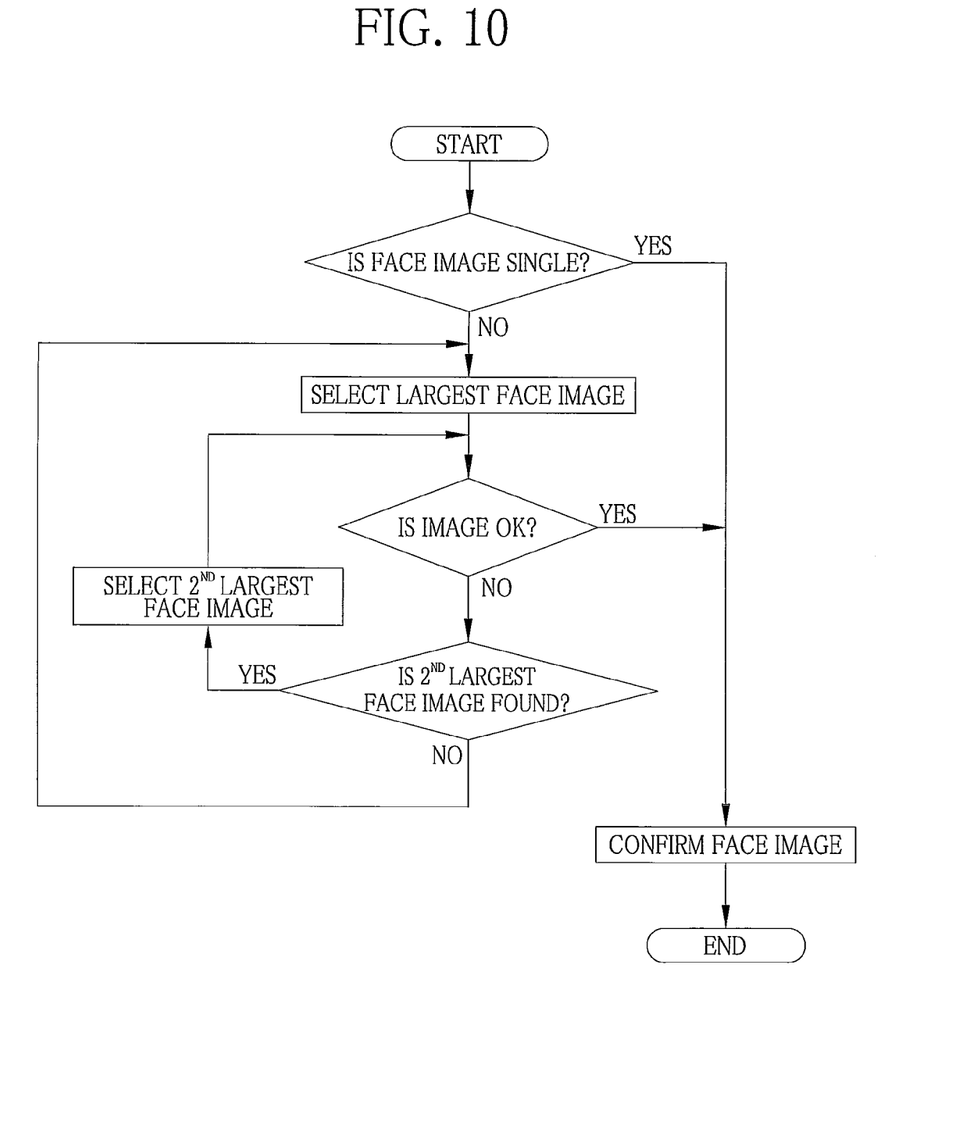
FIG. 10 is a flow chart illustrating steps for determining one of face images.

In FIG. 10, a flow of steps for determining a face image is illustrated. Upon detecting one or more face images, the face image selector 27 measures the number of the face images. If the face image is single, selection of the face image is confirmed. If there are plural face images, one of the face images having a largest size is selected, and displayed with a contour line C in FIG. 3. When the confirmation button 15 is depressed, selection of a contour line with the largest area is confirmed. Then if the selection button 14 is depressed, a second largest face image is selectively displayed, for example with a contour line C2 in FIG. 3. If the selection button 14 is depressed during display of a smallest face image, then a largest face image is displayed next.

In FIG. 9, when the face image is specified, the original image A is converted monochromatically by the gray scale processing device 31, and is segmented to obtain the first image area D by the image segmentation device 32. Also, the second image area E is specified from the original image A by the area specifying device 33 with a larger size than the first image area D, for example, 1.8 times as long a size as the first image area D. The histogram generator 34 produces the brightness histogram F from the first image area D. Then the feature point extracting device 35 retrieves position information of the eyes from the face image detector 26, to designate the eyeball point G and the shadow point H from the first image area D. Eyeball brightness P (at its pupil or iris) of the eyeball point G and the brightness Q of the shadow point H are measured. The modified histogram generator 36 modifies the brightness histogram F to produce a modified histogram K. Then a threshold R is obtained from the modified histogram K by application of the linear discriminant analysis. Image data of the second image area E is binarized by use of the threshold R for transformation to a binary image. Then the eye shape correction device 39 corrects the binary image for the edge enhancement, to obtain a final form of the binary image.

Various media other than a memory card can be used for storing binary images. Furthermore, the wireless LAN (local area network) may be used to transmit a binary image with an electronic mail. Also, an uploading device for uploading the binary image to a server on the Internet may be added.

In the above embodiment, the original image A is thresholded in the form of a binary image. However, the original image A can be thresholded in a form of a ternary or quaternary image in the present invention. Although thresholded images after 5 or 6-level encoding may be produced in the invention, the greatness of the number of the thresholds or encoding levels for the image thresholding is not always important. Another preferred embodiment will be described below, in which the number (N) of the encoding levels is selectively determined from two, three and four.

Generation of thresholded images in an image processing apparatus having a thresholding processor is described now, in which thresholded images of binary, ternary and quaternary encoding with two, three and four levels can be generated. The above embodiment is repeated structurally but with differences in that thresholds for the binary, ternary and quaternary encoding are determined, that all thresholded images after the binary, ternary and quaternary encoding are produced, and that a selector is additionally used for selecting one of the thresholded images after the binary, ternary and quaternary encoding.

Figure 11:
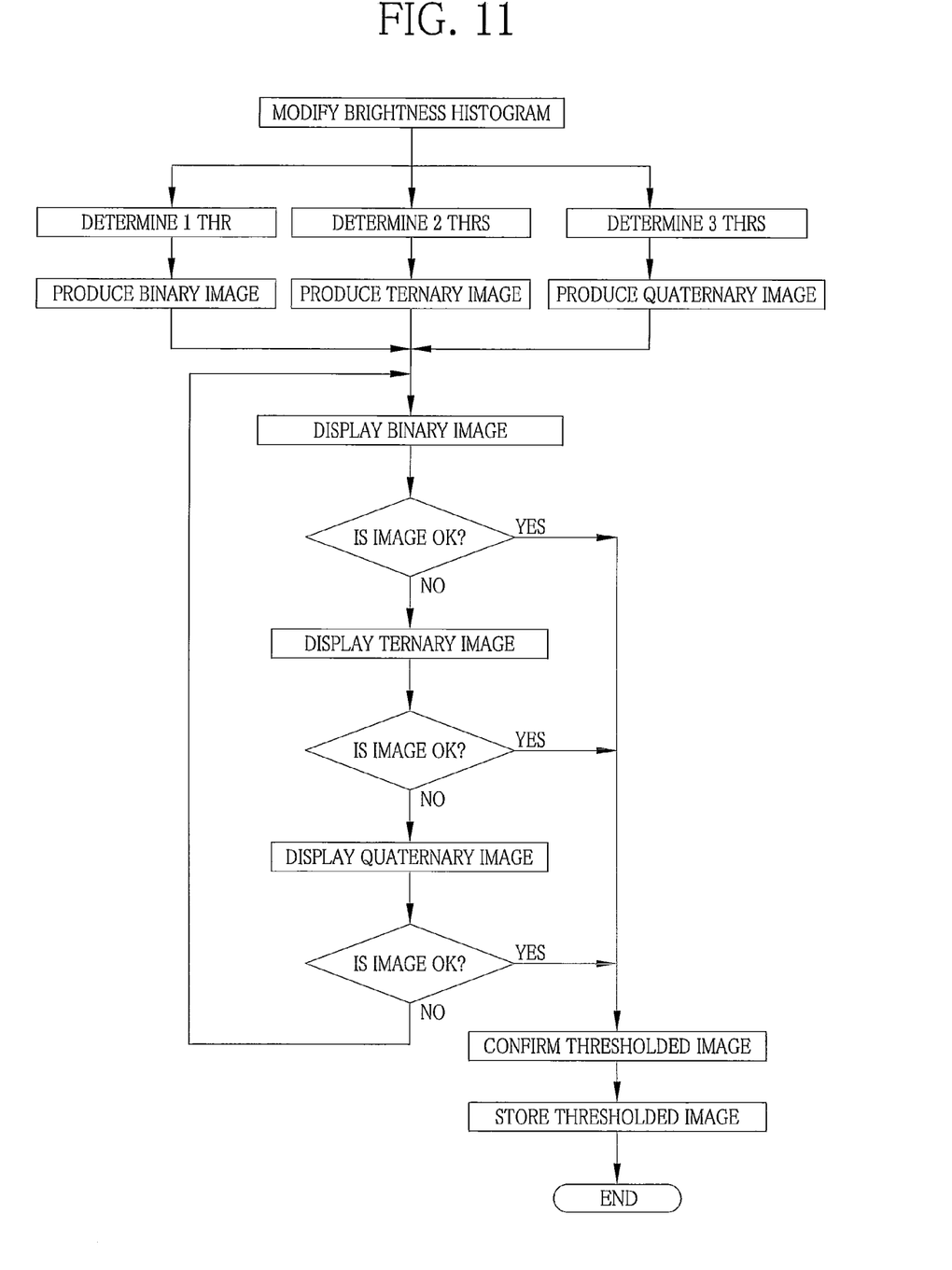
FIG. 11 is a flow chart illustrating steps for thresholding of N-level encoding.
Figure 12:
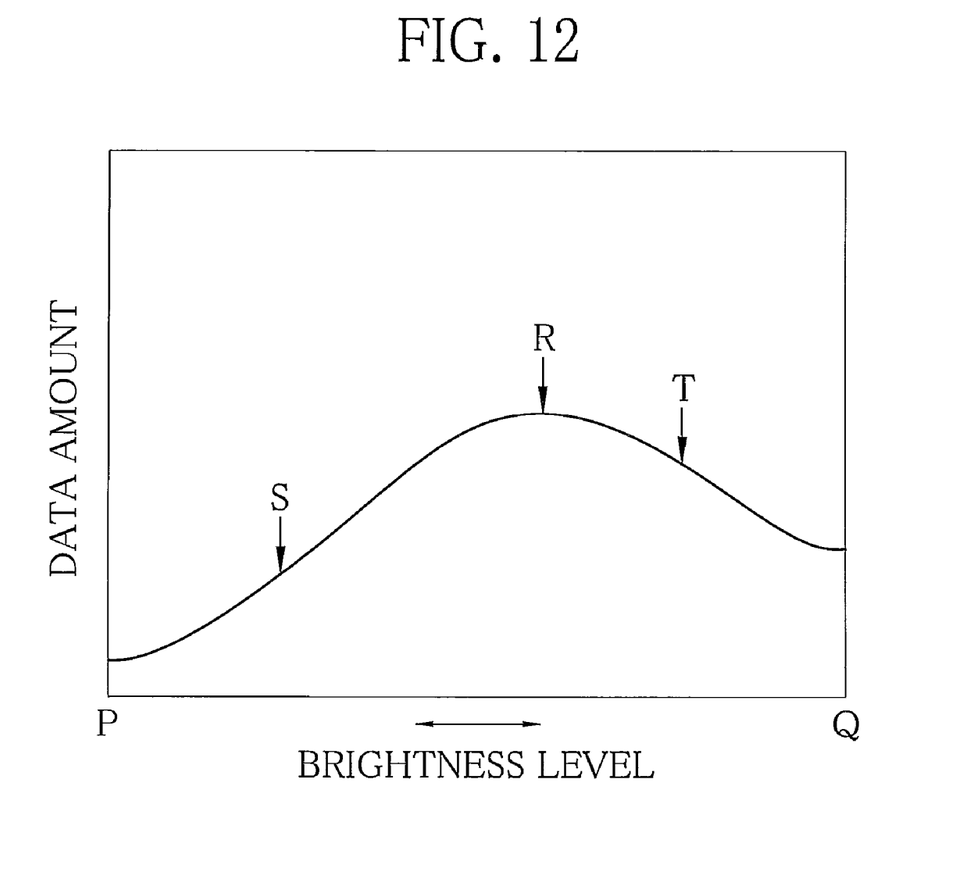
FIG. 12 is a graph illustrating a modified histogram for the thresholding.

In FIG. 11, a flow of the sequence of the embodiment is illustrated. The flow of FIG. 10 is repeated for obtaining the modified histogram K by correction of the brightness histogram F. A threshold R for binarization is obtained by application of linear discriminant analysis to the modified histogram K. Two further thresholds S and T are determined on the high and low brightness sides (See FIG. 12). Image data of a binary image is produced by thresholding the second image area E with the threshold R. Also, image data of a ternary image is produced by thresholding with the thresholds S and T. Image data of a quaternary image is produced by thresholding with the thresholds R, S and T. At first, the LCD 12 displays the binary image. The LCD 12, when the selection button 14 is depressed, changes over to display a ternary image, and when the selection button 14 is depressed again, comes to display a quaternary image. A user observes the image on the LCD 12, and then depresses the confirmation button 15. The image displayed in depressing the confirmation button 15 is confirmed for producing a thresholded image.

If there are plural face images in an original image, a largest face image is selected and displayed in the above embodiment. However, a sequence of displaying the face images is not limited. For example, priority in the face images in the sequence of display may be given to one of the face images directed in the camera direction in the original image, or to one of the face images with smile.

In the above embodiment, thresholded images of binary, ternary and quaternary encoding are selected while visually checked by a user. However, it is possible automatically to select an optimum one of thresholded images of binary, ternary and quaternary encoding according to the brightness histogram and the modified histogram by use of a histogram recognition device and pattern template information.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image processing method of image processing of a face image, comprising steps of:
processing said face image monochromatically by gray scale processing;
segmenting a first image area inclusive of a skin area of a face from said face image after said gray scale processing;
specifying a second image area inclusive of said first image area and also a hair area of said face in said face image;
generating a brightness histogram of said first image area;
extracting a shadow point and an eyeball point of said face from said first image area, said shadow point having a lowest brightness in said skin area;
generating a modified histogram by modifying said brightness histogram so as to correct a specific area having a lower brightness level than said eyeball point at a brightness level of said eyeball point, and to correct a specific portion in said skin area having a higher brightness level than said shadow point at a brightness level of said shadow point;
determining one to three thresholds from said modified histogram;
thresholding said second image area by use of said one to three thresholds to produce an N-level encoded image, where N is an integer of 2 or more.

2. An image processing method as defined in claim 1, wherein information of N is input by external operation.

3. An image processing method as defined in claim 1, further comprising a step of detecting an eye shape by retrieving coordinates of eyes from said face image, and of enhancing an edge of said eye shape for correction.

4. An image processing method as defined in claim 2, further comprising a step of converting said N-level encoded image into vector data.

5. An image processing apparatus for image processing of a face image, comprising:
a gray scale processing device for processing said face image monochromatically by gray scale processing;
an image segmentation device for segmenting a first image area inclusive of a skin area of a face from said face image after said gray scale processing;
an area specifying device for specifying a second image area inclusive of said first image area and also a hair area of said face in said face image;
a histogram generator for generating a brightness histogram of said first image area;
a feature point extracting device for extracting a shadow point and an eyeball point of said face from said first image area, said shadow point having a lowest brightness in said skin area;
a modified histogram generator for generating a modified histogram by modifying said brightness histogram so as to correct a specific area having a lower brightness level than said eyeball point at a brightness level of said eyeball point, and to correct a specific portion in said skin area having a higher brightness level than said shadow point at a brightness level of said shadow point;
a threshold generator for determining one to three thresholds from said modified histogram;
an image thresholding device for thresholding said second image area by use of said one to three thresholds to produce an N-level encoded image, where N is an integer of 2 or more.

6. An image processing apparatus as defined in claim 5, further comprising an output interface for outputting said N-level encoded image from said image thresholding device.

7. An image processing apparatus as defined in claim 5, further comprising an input interface for inputting information of N.

8. An image processing apparatus as defined in claim 7, further comprising an eye shape correction device for detecting an eye shape by retrieving coordinates of eyes from said face image, and for enhancing an edge of said eye shape for correction.

9. An image processing apparatus as defined in claim 5, further comprising a vector data converter for converting said N-level encoded image into vector data.

* * * * *